Sept. 23, 1941.   W. OSENBERG   2,256,847
TOOL
Filed Sept. 7, 1937
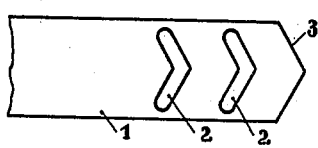
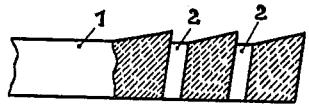
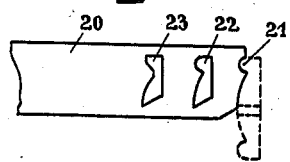
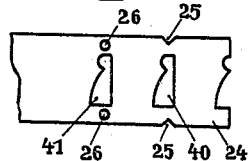
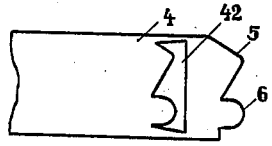
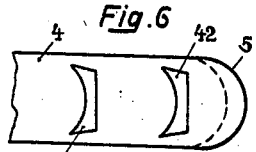
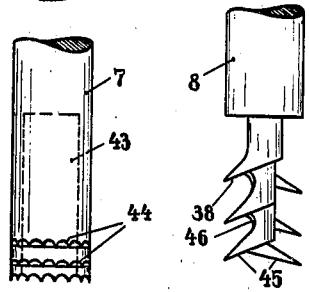
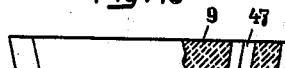
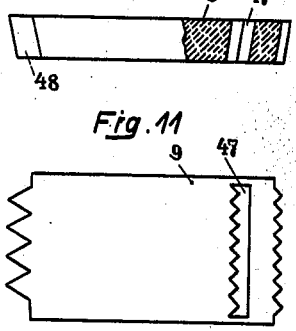
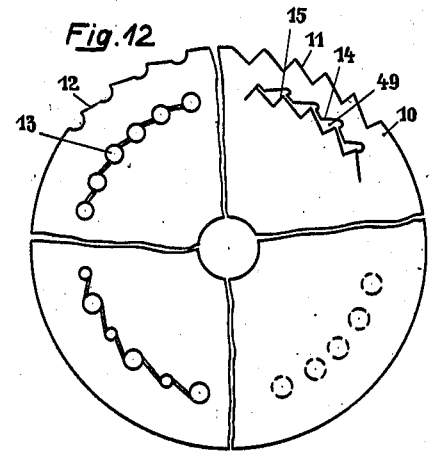

Patented Sept. 23, 1941

2,256,847

UNITED STATES PATENT OFFICE 2,256,847

TOOL

Werner Osenberg, Dresden, Germany, assignor to Kerb-Konus Gesellschaft Dr. Carl Eibes & Co., Dresden, Germany Application September 7, 1937, Serial No. 162,757
In Germany December 15, 1936

12 Claims. (Cl. 29—95)

The present invention relates to a new and improved tool for cutting, milling, drilling, grinding or the like made from ceramic material.

It is an object of the invention to form a tool of this type which may be a file, a reamer, a punch and even a polishing and grinding tool which will advantageously operate and work upon objects that have an especially great abrasive effect such as objects consisting of hard paper, stone, artificial stone, glass, mother of pearl, pressed compositions, artificial resin compounds, metal alloys or the like, the softer metal and also in some cases the harder metal.

It is a further object of the invention to devise a tool of the class indicated which will not clog as easily as metal tools.

A still further object of the invention is to provide a tool of the type indicated so that when the working surfaces become worn or damaged it is possible to provide a new working surface quickly and easily.

A further object of the invention is to provide a tool of the characteristics indicated which will have an extremely long life and which will utilize the working surfaces provided thereon to the utmost limit according to the working conditions while at the same time also providing the possibility of bringing into operation differently profiled working surfaces one after the other so as to perform various kinds of work with one and the same tool.

An additional object is to provide a construction in the tool whereby the replacement of the working surfaces by subsequent working surfaces may be automatically brought about by the operating conditions themselves or may be substituted in place of the former operating surfaces by breaking off the support of such former operating surfaces at a desired position.

A further purpose is to provide weakened portions in the material of the tool between the support for the first operating surfaces and the supports of subsequent operating surfaces and utilizing these weakened portions for facilitating the breaking off of the support of the first operating surfaces or making such severance obligatory at certain operating pressures.

In order to permit the tool of the character indicated to present a smooth outer surface which is essentially necessary in tools of disc shape such weakened portions, which may take the form of recesses, are filled with a softer ceramic material, a soft metal or an artificial compound such as an artificial resin composition or the like.

Furthermore the invention is not restricted to hard porcelain but may be applied to tools of any desired material. As is obvious however the connection points between successive cutting edges must be adjusted to the type of material used and if recesses are used between successive cutting edges then in such case these recesses must be of such size as to correspond with the strength of the material used in order to permit the removal of cutting edges that have become blunt or unserviceable or undesirable for any reason.

A further object of the invention is to provide a tool wherein the holder therefor is made integral therewith. In such case the tool is given its definite shape in the raw material before baking so that subsequent treatment to give it the actual tool form is not necessary as is, for example, always the case with tools made of metal.

A further object of the invention is to provide a tool made from material which is exceedingly cheap so that a resharpening of the operating surfaces, which although often practicable, may be dispensed with, since it has been found that it is more advantageous to simply replace the worn out tool with a new one.

A further object of the invention is to manufacture tools of the kind indicated which consists mainly in shaping them and then subsequently baking them but at the same time providing such tool with several operating surfaces displaced with respect to each other and which operating surfaces may be produced in the same process without any further expenditure in labor, etc. On wear taking place in tools of this character, these working or operating surfaces may be made use of successively by merely turning the tool in its holder.

An additional object is to provide operating surfaces which are different in design so that various types of work may be performed by one and the same tool by making successive use of such differently designed operating surfaces. For instance, one operating surface could accomplish the rough planing while a successive surface accomplishes a fine planing and then a still further successive surface would polish the object operated upon.

A further object of the invention is to provide a tool of the material indicated wherein such tool is provided with two or more operating surfaces located in back of one another in the direction of operation and in which the operating surface that first comes into operation consists of a part of the tool that is made from hard ceramic material. The second working surface may also consist of a part of the tool that is made from hard ceramic material, however, in this instance the second or subsequent operating surface may be made of steel. Of course the parts of the tool provided with the different working surfaces are kept constructionally separate from one another and as regards their operating surfaces such surfaces are separately positioned adjustably in a tool holder.

With these and other objects in view which will become apparent from the detailed description below, the invention is more particularly described with reference to the accompanying drawing, in which:

Figure 1 shows a partial plan view of a tool constructed in accordance with the invention.

Figure 2 is a cross sectional view of the tool shown in Figure 1.

Figure 3 illustrates a rotary cutter.

Figure 4 is a modified form of cutter.

Figure 5 shows a partial elevational view of a modification in which a polishing member is located under the cutting edge.

Figure 6 is a partial plan view of the tool shown in Figure 5.

Figure 7 is a partial cross sectional view of the modification shown in Figure 5 illustrating recesses which do not entirely penetrate the tool.

Figure 8 is a partial elevational view of a hollow drill.

Figure 9 illustrates the invention as applied to a drill or a milling type of tool and the view shows the same in partial elevation.

Figure 10 is an elevational view with portions in cross section illustrating the invention as applied to a thread chaser.

Figure 11 is a plan view of the thread chaser shown in Figure 10.

Figure 12 is an elevational view of a further modification illustrating the invention as applied to a grinding or milling wheel.

In the drawing like reference characters will be used to indicate like parts.

A basic feature of the invention resides in the type of material from which the kerf removing tools are made. Tools of the type indicated have never heretofore been made from this material.

The hard ceramic raw material in pulverized form or the like may be combined with a suitable ceramic binding agent to form a hard substance from which the tools are manufactured with subsequent baking or the ceramic raw material such as corundum may be transformed by vitrification into a hard substance which is directly formed in the shape of the tool desired.

The ceramic raw material may be either a naturally existing substance or one that is produced artificially by first manufacturing a ceramic raw material by baking or fusing as for example in an electric furnace and then converting it by trituration into powder form or the like and then this material in pulverized form is treated in either of the two ways set out immediately above.

The natural raw materials comprise hard ceramic substances such as corundum, flint or the like. The artificial materials comprise a material produced in the electric furnace from pure bauxite, the slag produced from alumina in the thermal process, carborundum, carbosilite, which consists of silicon carbide, which is manufactured in the electric furnace from quartz and coke and also boron carbides. Other raw materials that may be mentioned are the oxides of zirconium and magnesium-aluminium compound.

As a binding agent kaolin may be mentioned as an example. Obviously one of the above mentioned substances may also be used as a binding agent providing a ceramic material that is more difficult to fuse is selected as the base material. For instance, a thorium oxide, which has a melting point of about 3,000° C. could be combined in accordance with the first method set out above with zirconium oxide which has a melting point of about 2700° C. In this case the zirconium oxide would act as the binding agent.

The importance of the present invention resides in the use of a hard material of the above generally defined ceramic nature for tools such as cutting tools, millers, drills, reamers, files or the like.

The application of such a material to tools of various types shown in the drawing will now be described in detail.

In Figure 1 a cutting tool is indicated at 1 which is provided with the recesses 2. The cutting edge is shown at 3. When the cutting edge 3 becomes damaged or worn for any reason then the recesses 2 will permit the breaking off of the material located between the damaged cutting edge and the adjacent recess. As indicated a plurality of recesses may be arranged one in back of the other on the tool. The distance that the recesses are apart from one another and from the edge of the tool is determined by the operating conditions. The recesses 2 may have any desired shape and they may be circular or triangular. A major condition is that after the material located between them is broken off that a good cutting edge should result. Furthermore the recesses 2 may also be used for supplying a cooling medium to the cutting point.

In Figure 3 there is illustrated a rotary cutter 20 which is provided with the differently shaped cutting profiles 21, 22 and 23 positioned one in back of the other. In this case as the cutting tool is broken off at the recesses a modified or differently shaped cutting surface is exposed. Due to this construction different cutting operations may take place upon the object being operated upon.

In Figure 4 a slight modification is shown in a rotary cutter 24. In this case notches 25 are located in alignment with the recess 40 and apertures 26 are provided in alignment with the recess 41. The notches 25 or the apertures 26 will facilitate the breaking off of the cutting tool at the particular recess desired. As is obvious any particular tool of this type may be provided with notches similar to the notches 25 extending throughout the entire length of the tool wherever recesses are provided or instead of the notches 25 apertures 26 may extend throughout the length of the tool at the recess positions.

In Figures 5, 6 and 7 there is illustrated a tool 4 in which a polishing element 6 is provided on the tool located under the cutting edge 5. As particularly indicated in Figures 6 and 7 the recesses 42 are located in back of each other but instead of passing entirely through the tool terminate short of the bottom thereof in order to increase the strength of the tool. However tools designed with recesses such as 42 will also permit the breaking off of the worn or damaged cutting edge and the exposing of the new cutting edge. When an old cutting edge is broken off a polishing member which may be formed of the material itself or which may be formed of another material embedded in the material of the tool is also exposed together with the new cutting edge.

In Figure 8 the invention is shown as applied to a hollow drill 7. The hollow bore of the drill is indicated at 43 and in this case the recesses at which the drill is to be broken off for the purpose of exposing new cutting edges is indicated at 44.

In Figure 9 there is illustrated a drill or a milling type of tool 8 in which the bottom teeth 45 operate upon the object being treated. The teeth have a bottom inclination as shown at 38 which assist the recesses 46 in the severance of the worn and damaged cutting portions.

In Figures 10 and 11 the invention is illustrated as applied to a thread chaser 9. In this constructional form recesses 47 of the type shown are provided and instead of the one recess illustrated it is obvious that a plurality may be provided located one in back of the other as shown at 2 in Figures 1 and 2. In addition a thread chaser of different characteristics may be provided at the other end of the tool as shown at 48.

In Figure 12 the invention is shown applied to a tool 10 which is in the form of a grinding wheel. The operating profile is shown at 11. This same operating profile may be continued throughout the entire tool but in the form shown in Figure 12 various different designs of cutting profiles are shown which may be for different types of work desired done by the tools. The recesses 49 provided in the tool may be designed in such a way that the breaking off of the intermediate material in back of the blunt or damaged cutting edge will either expose a cutting edge of the same type or if desired one of an entirely different design such as shown at 12, for instance, which is formed by a recess having a general configuration shown at 13. The cutting edges on a tool of the type shown in this figure must be arranged in saw tooth zig zag pattern in order to provide a clean cut. In so far as the grooves or constructions are disposed for the support of the parts to be broken off, they must be given such dimensions that the tool will retain the necessary strength and the position thereof must be so selected that good cuting edges are always provided after the breaking off of the blunt or worn cutting edges. For this purpose as shown in figure 12 the curved limiting line 14 for the recesses 49 extend over the points of the teeth 15. Tools of such a disc shape can to a certain extent sharpen themselves by starting the disc against the object being operated upon with a suitably heavy pressure. By starting the tool in this way damaged or partially destroyed cutting edges will break off until the next cutting edge provided by the recess is exposed. It is of course also possible to cause the breaking off to take place by the use of tools such as pliers, etc. Also the breaking off may be accomplished by driving conically shaped pins into the holes in the tools or chisels may be applied to notches which have been provided.

I claim:

1. A tool comprising essentially a body of ceramic material, a cutting edge provided thereon, said body having a recess located in back of said cutting edge of such configuration that when the portion of said body containing said cutting edge is removed a new cutting edge constituting a wall of said recess is exposed.

2. A tool comprising a body of ceramic material, a cutting edge provided thereon, said body having a recess located in back of said cutting edge of such configuration that when the portion of said body containing said cutting edge is removed a new cutting edge constituting a wall of said recess is exposed, and said recess being so disposed as to form weakened portions to facilitate the removal of the portion of said body containing said first-mentioned cutting edge.

3. A rotary cutting tool comprising a body of ceramic material, cutting edges upon the periphery of said tool and said body having recesses which define interior new cutting edges when the peripheral cutting edges are removed.

4. A tool comprising a body of ceramic material, working profiles on said body and recesses in said body arranged in back of one another defining new working profiles of varying characteristics.

5. A hollow drill comprising a body of ceramic material and recesses in said body defining additional new cutting edges upon the removal of the exterior cutting edges.

6. A drill comprising a body of ceramic material and cutting points upon said body located in back of one another and said body having recesses between said point in order to facilitate the breaking off of worn or blunted points.

7. A thread chaser comprising a body of ceramic material having a series of cutting edges located in back of one another and having a series of weakened portions so that blunted cutting edges may be severed from the body and thereby expose new cutting edges.

8. A method of making a tool comprising forming a body of ceramic material having recesses therein defining cutting edges, said recesses having been formed within said body during the baking process by burning combustible material of the desired configuration.

9. A tool comprising a body made of ceramic material, a plurality of working surfaces on said body displaced with respect to one another so that said working surfaces may be brought into consecutive service by a corresponding turning of said tool in a holder.

10. A tool comprising a body of hard ceramic material, a central flat surface upon said tool designed to cooperate with a holder for said tool and a series of cutting surfaces upon said tool formed by concavities extending from said central flat surface to the peripheral edge of said tool.

11. A kerf removing tool having a plurality of working surfaces located one in back of each other in the direction of operation and the working surface which first comes into action being made of hard ceramic material.

12. A kerf removing tool comprising a plurality of members having different working surfaces which are constructionally separated from one another and said working surfaces being such as to be separately adjustable in a tool holder and said members being made of a hard ceramic material.

WERNER OSENBERG.